United States Patent [19]
Hayter et al.

[11] Patent Number: 5,677,906
[45] Date of Patent: Oct. 14, 1997

[54] ATM COMMUNICATION SYSTEMS

[75] Inventors: Andrew Timothy Hayter, Southampton; Simon Paul Davis, Romsey, both of England

[73] Assignee: Roke Manor Research Limited, Hampshire, England

[21] Appl. No.: 424,202

[22] Filed: Apr. 19, 1995

[30] Foreign Application Priority Data

Apr. 20, 1994 [GB] United Kingdom ............ 9407806

[51] Int. Cl.$^6$ .................................................. H04J 3/16
[52] U.S. Cl. .................. 370/235; 370/391; 370/398; 370/468
[58] Field of Search .................... 370/17, 58.2, 60, 370/60.1, 61, 79, 85.2, 85.6, 85.7, 94.2, 235, 252, 391, 395, 398, 468

[56] References Cited

U.S. PATENT DOCUMENTS

| | | | |
|---|---|---|---|
| 4,914,650 | 4/1990 | Sriram | 370/60 |
| 5,132,966 | 7/1992 | Hayano et al. | 370/79 |
| 5,390,176 | 2/1995 | Schoute et al. | 370/60.1 |
| 5,448,559 | 9/1995 | Hayter et al. | 370/60.1 |
| 5,463,620 | 10/1995 | Sriram | 370/60 |
| 5,497,371 | 3/1996 | Ellis et al. | 370/60 |

FOREIGN PATENT DOCUMENTS

| | | |
|---|---|---|
| 0 596 624 A2 | 5/1994 | European Pat. Off. |
| WO A 86/02510 | 4/1986 | WIPO |
| WO 92/19060 A1 | 10/1992 | WIPO |

OTHER PUBLICATIONS

IEEE Communications Magazine, vol. 32, No. 3, Mar. 1994, pp. 86–98, "ATM Local Area Networks", by P. Newman.
IBM Technical Disclosure Bulletin, vol. 37, No. 2A, Feb. 1994, pp. 243–246, "MAC Layer Handling Of Preemptive And Nonpreemptive Priorities In Buffer-Insertion Lans".

*Primary Examiner*—Russell W. Blum
*Attorney, Agent, or Firm*—Hill, Steadman & Simpson

[57] ABSTRACT

AN ATM communication system having both dynamic bandwidth allocation capability comprising storage mechanism for DBA traffic, the storage mechanism further including dedicated storage mechanism for ABR traffic. The system being such that ABR bandwidth requests are allocated after all other DBA bandwidth allocations have been satisfied. A device for interrupting an ABR transmission, before a bandwidth allocation within which the said ABR transmission is included has been fully used, for the transmission of other higher priority DBA traffic is provided.

4 Claims, 2 Drawing Sheets

ATM COMMUNICATION SYSTEMS

BACKGROUND OF THE INVENTION

1. Field of the Invention

This invention relates generally to asynchronous transfer mode (ATM) communication systems and, more particularly, the present invention relates to an ATM communication system which is capable of both dynamic bandwidth allocation and available bit-rate service.

2. Description of the Related Art

ATM communication systems comprise networks and switches required to support a mixture of traffic including bursty traffic. By its nature, bursty traffic requires a high bit-rate transmission for part of the time and little or no transmission rate for the rest of the time. In order to efficiently use the bit-rate available in a network, it is necessary to allocate to a connection a lower bit-rate than its peak bit-rate such that the total peak bit-rate of all connections is greater than the bit-rate of the network links in combination.

ATM cells destined for a particular output port of a switch will enter the switch from many different input ports. The total instantaneous rate of these cell flows may be greater than the output port of the ATM switching network (ASN) can sustain, and thus a temporary overload of the output port may occur. Reducing the output port average load may reduce the probability of an overload occurring to an acceptable level, however, this results in low utilization levels for the network which is not generally acceptable.

In an alternative approach, large buffers may be included in an ATM switch which serve to buffer the overload cells causing them to be delayed so that they can be transmitted at the peak rate. One of the problems with large buffers, however, is that the transmission of ATM cells across a switch becomes very complex and requires detailed organization of the cell transmission protocol. This problem may be satisfactorily overcome by means of a technique known as "Dynamic Bandwidth Allocation" (DBA) which is used to fairly share the available bandwidth between data input queues to a switch. DBA operation is described in our co-pending patent application now issued as U.S. Pat. No. 5,448,559 which is incorporated herein by reference.

Although the DBA protocol described in our issued United States patent referenced above is satisfactory for most purposes, there is a need for a new service which is characterized as being loss sensitive but delay insensitive. For example, one which is intolerant of cell loss but tolerant of longer than usual delays. This service will hereinafter be referred to as "Available Bit-Rate" (ABR) service. This new proposed ABR service is intended for system users which require to move data around but do not mind how long it takes. The ABR service is also useful for network operators because it may be implemented by buffering data at the ingress of a switch and only sending it across a switch core when bandwidth is not being used for any other services. It thus increases network utilization and profitability. It is desirable to provide a system having both DBA and ABR but known DBA systems do not have this capability. It is therefore an important object of the present invention to provide an ATM communication system having DBA capability which also will provide ABR service traffic.

According to the present invention, an ATM communication system having DBA capability comprises a storage means for DBA traffic which further includes a dedicated storage means for ABR traffic. The system being designed such that ABR bandwidth requests are allocated after all other DBA bandwidth allocations have been satisfied. The system includes a means for interrupting an ABR transmission for the transmission of other (higher priority) DBA traffic before a bandwidth allocation within which the ABR transmission is included has been fully used. It is understood that a system incorporating the present invention may need to monitor the incoming bit rate to assure that the input buffers do not overflow.

The ATM communication system may comprise a plurality of statistical multiplexer units (SMU's) on an "input side" of the switch and a plurality of SMU's on an "output side" of the switch, the "input side" SMU's comprising a plurality of memories, one for each "output side" SMU in which ATM cells for transmission across the switch are stored. Each memory on the "input side" of the switch is operatively associated with a server. The servers are controlled in accordance with the DBA protocol by an "input side" resource allocation means, to effect transmission as described above in a fair manner. The resource allocation means may include a RAM table for storing data pertaining to the bandwidth or bit rate allocated to ABR traffic for each of the "output side" SMU's.

Each SMU on the "output side" of the switch may include an ABR request memory which forms a part of the "output side" resource allocation means within which ABR bandwidth requests are stored. The "output side" resource allocation means being arranged to provide acknowledgement signals indicative of resource availability. The acknowledgement signals are transmitted across the switch to the "input side" resource allocation means to appropriately initiate data transmission across the switch.

It is important to appreciate that these acknowledgement signals not only indicate to each "output side" SMU when ABR bandwidth has become available, but also when allocated ABR bandwidth should be withdrawn for the time being. This makes bandwidth available for higher priority DBA traffic.

It should be understood that DBA bandwidth resource requests and acknowledgement signals are transmitted across the switch to facilitate normal DBA operation and that dedicated ABR requests and acknowledgements are additionally transmitted and stored as appropriate. It is therefore necessary in each "output side" SMU to provide storage means in which ABR bandwidth requests are stored separately from all other DBA bandwidth requests. In this way bandwidth resource allocation can be managed efficiently such that ABR, ATM cells are transmitted only when all other DBA ATM cell traffic has been taken care of.

The preferred exemplary embodiment of the present invention will now be described by way of example with reference to the accompanying drawings, in which:

DESCRIPTION OF THE PRESENTLY PREFERRED EMBODIMENTS

Figure 1:
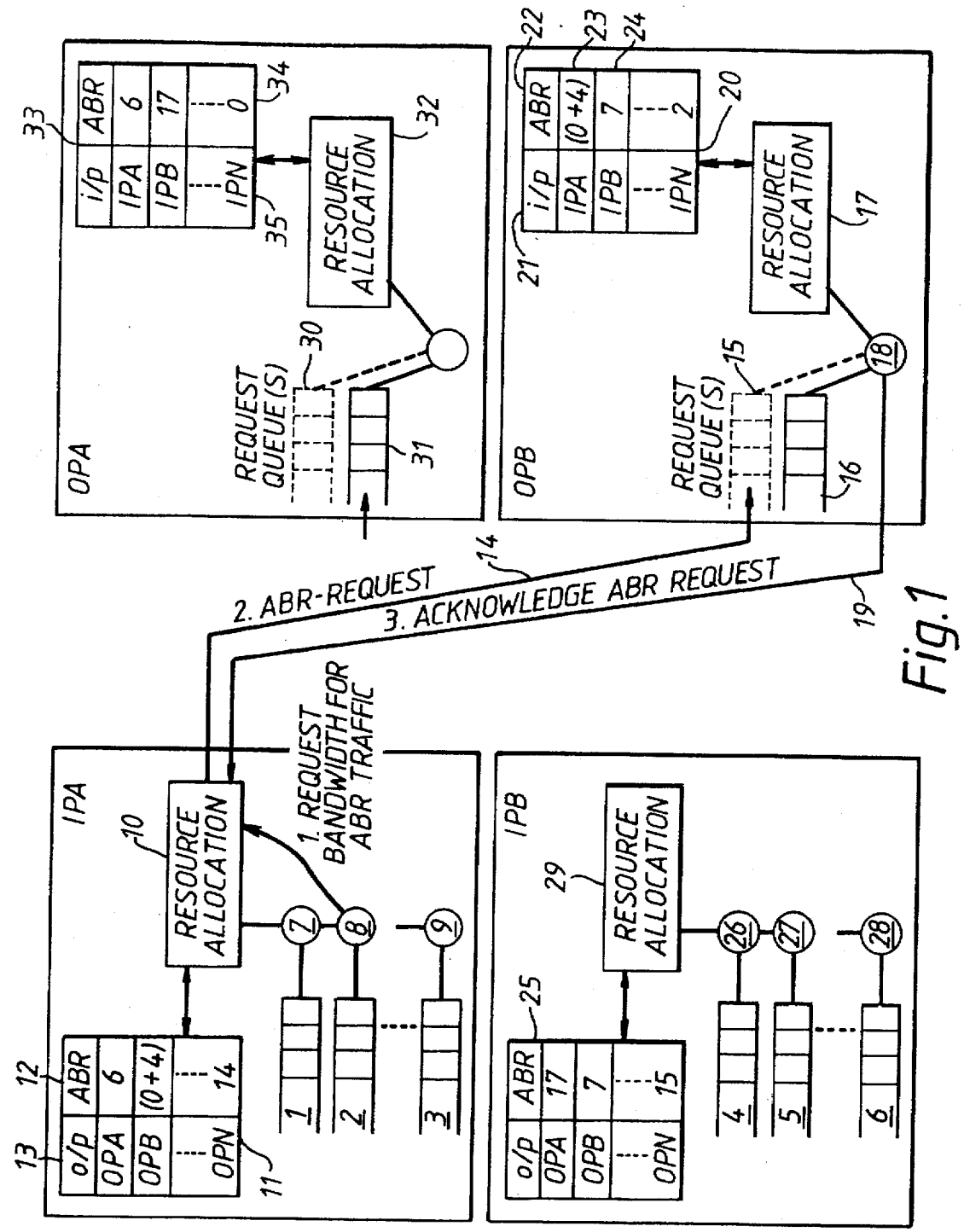
FIG. 1 is a schematic block diagram of part of an ATM system showing how ABR requests and acknowledgements are transmitted across a switch.

Referring now to FIG. 1, an ATM system comprises a plurality of statistical multiplexing units (SMU's), only two of which IPA and IPB are shown. The SMU's such as IPA and IPB on the "input side" of a switch (not shown) are arranged in communication across the switch with a plurality of SMU's on the "output side". Only two of the output side SMU's designated OPA and OPB respectively are shown. It is appreciated that although only two SMU's are shown on the "input side" and "output side" of the switch respectively, larger numbers of SMU's may be provided in accordance with the size of a system. Within each SMU a plurality of memories are provided which store ATM cells for transmission across the switch. Thus in the SMU IPA, memories 1, 2 and 3 are shown and similarly in SMU IPB memories 4, 5 and 6 are shown. Each "input side" SMU has a dedicated memory for each SMU on the "output side" of the switch. Requests are triggered from the memories 1, 2 and 3 and are fed via servers 7, 8 and 9 respectively to a resource allocator 10 which comprises a RAM table related to bandwidth availability on the "output side" of the switch. The resource allocator 10 is also provided with information pertaining to the class of service to which particular ATM cells relate. Thus priority allocation of bandwidth resources becomes possible.

The parts of the system thus far described are common to a DBA system of the kind described in our now issued United States patent referenced above. In order to provide for an ABR service, the resource allocation unit 10 is arranged additionally to include a RAM table 11 which includes data pertaining to the number of ABR bandwidth units for transmission as shown in column 12, and, as shown in column 13, their destination on the "output side" of the switch. Thus, as can be seen from the RAM table 11, the SMU, OPA, on the "output side" of the switch has an ABR bandwidth allocation of six bandwidth units; the SMU, OPB, has requested four bandwidth units; and been granted zero bandwidth units, and the SMU, OPN, has been granted a bandwidth allocation of fourteen bandwidth units.

As shown schematically, ABR bandwidth requests for transmission from IPA to OPB are fed via a line 14 and queued in a memory 15 in the SMU, OPB. Other higher priority DBA bandwidth requests are queued in a memory 16. When bandwidth is available, as determined by a resource allocator 17, acknowledgements are sent via a server 18 and a line 19 to the resource allocator 10 in the SMU, IPA. The resource allocator 17 includes a dedicated RAM table 20 for ABR messages which is in addition to the RAM storage (not shown in detail) for the other DBA bandwidth requests. Bandwidth requests pertaining to the input SMU's are designated in column 21 and bandwidth units pertaining to each SMU listed is as shown in column 22. Thus, it can be seen that the SMU IPA has requested four units of bandwidth but has so far received a zero allocation. Similarly it can be seen that the input SMU, IPB, has been allocated seven units of bandwidth. This corresponds to the contents of RAM table 25 in the SMU, IPB. It is appreciated that the memories, 4, 5 and 6 in the SMU, IPB, communicate via servers 26, 27 and 28 under control of a resource allocator 29 with SMU's on the "output side" of the switch. It also will be appreciated that the SMU, OPA, on the "output side" of the switch is provided with a memory 30 for ABR requests and a memory 31 for other DBA requests. The memories 30 and 31, which correspond with the memories 15 and 16 respectively of the SMU, OPB, and are operated under control of a server 32a corresponding to the server 18. Similarly a resource allocator 32b is provided in the SMU OPA which includes a RAM table 33 shown in detail, which stores details of the number of units of bandwidth allocated as shown in a column 34 and the input SMU's to which they relate as shown in a column 35. The server 32a is controlled by the resource allocator 32b.

Figure 2:
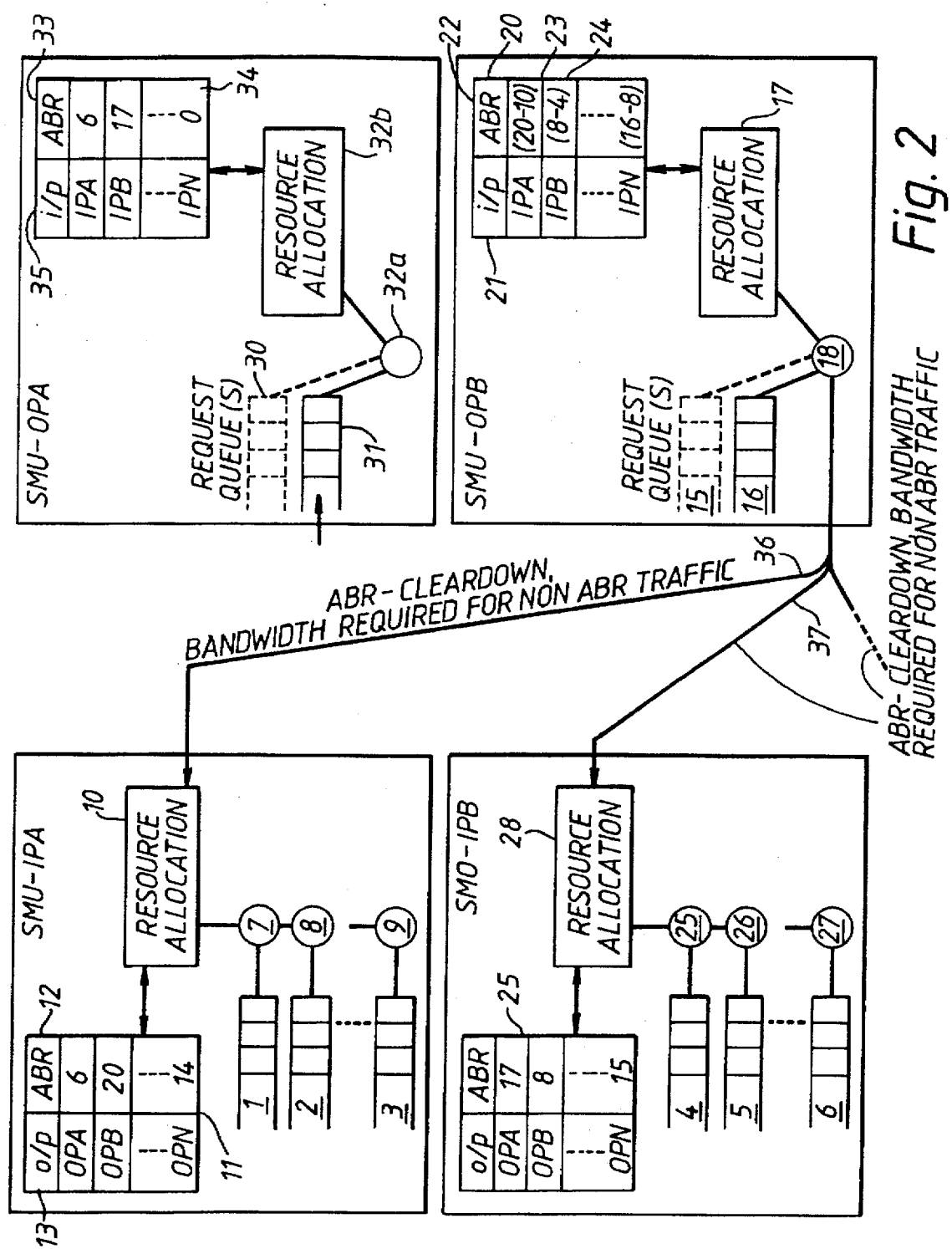
FIG. 2 is a schematic block diagram showing "cleardown" operation of the system shown in FIG. 1.

It is important to appreciate that allocated ABR bandwidth can be cleared down to facilitate the transmission of higher priority DBA traffic and the manner in which this is effected is shown schematically in FIG. 2 wherein corresponding parts of the system bear, where appropriate, the same numerical designations.

Referring now to FIG. 2, as shown schematically by line 36, clear-down requests are routed to all resource allocators that have acting ABR traffic on OPB including the resource allocator 10 from the server 18 when bandwidth is required by the SMU OPB for non-ABR traffic. The transmission of ABR traffic is thus temporarily decreased in rate. Similarly clear-down signals are sent as appropriate from the server 18 via a line 37 to the resource allocator 28 for a similar purpose as required by the SMU, IPB.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. An ATM communication system comprising:

a first storage means for storing DBA traffic requests at an input statistical multiplexing unit;

a second storage means for storing ABR traffic requests at the input statistical multiplexing unit;

an input resource allocation means associated with the input statistical multiplexing unit for allocating ABR bandwidth requests after all DBA bandwidth allocations have been satisfied, said input resource allocation means including interrupt means for interrupting an ABR traffic transmission to permit DBA traffic transmission having a higher priority; and further comprising a plurality of input statistical multiplexing units: a plurality of output statistical multiplexing units; an ATM switch connecting the input statistical multiplexing units and the output statistical multiplexing units, each input statistical multiplexing unit having a plurality of memories at least one memory for each corresponding output statistical multiplexing unit and wherein each of the plurality of memories is operatively associated with a server which is controlled by the resource allocation means.

2. The ATM communication system of claim 1, wherein the resource allocation means is further comprised of a RAM table for storing data related to a bandwidth allocated to ABR traffic.

3. The ATM communication system of claim 2, wherein each of the output statistical multiplexing units has an output side resource allocation means which is comprised of an ABR request memory for storing ABR bandwidth requests, said output side resource allocation means arranged to provide acknowledgement signals to the input resource allocation means.

4. The ATM communication system of claim 3, wherein the acknowledgement signals indicate when an ABR bandwidth is available.

* * * * *